United States Patent [19]

Hara

[11] Patent Number: 4,929,967
[45] Date of Patent: May 29, 1990

[54] EXPOSURE DEVICE USING CRT AS EXPOSURE LIGHT SOURCE

[75] Inventor: Yoshimasa Hara, Nagoya, Japan
[73] Assignee: Brother Kogyo Kabushiki Kaisha
[21] Appl. No.: 337,855
[22] Filed: Apr. 14, 1989

[30] Foreign Application Priority Data

Apr. 14, 1988 [JP] Japan .............................. 63-49403[U]

[51] Int. Cl.$^5$ ......................... G01D 9/42; G01D 15/14
[52] U.S. Cl. .................................. 346/110 R; 346/160
[58] Field of Search ............................. 346/110 R, 160

[56] References Cited

U.S. PATENT DOCUMENTS

| | | | |
|---|---|---|---|
| 4,233,612 | 11/1980 | Hirayama et al. | 346/160 |
| 4,310,226 | 1/1982 | Manber et al. | 346/110 R X |
| 4,343,542 | 8/1982 | Jonker et al. | 346/110 R X |
| 4,373,156 | 2/1983 | Pfannkuch et al. | 346/110 R X |
| 4,394,076 | 7/1983 | Manber et al. | 346/110 R X |

Primary Examiner—George H. Miller, Jr.

[57] ABSTRACT

To record a CRT image on a photosensitive recording medium, the latter is exposed to an image bearing light emanated from a display screen of a CRT. Currents flowed through horizontal and vertical deflection coils are varied to thereby change the horizontal and vertical sizes of the image displayed on the CRT, whereby the size of the image recorded on the recording medium can be changed without moving the position of the recording medium and/or a focusing lens interposed between the display screen of the CRT and the recording medium.

4 Claims, 1 Drawing Sheet

EXPOSURE DEVICE USING CRT AS EXPOSURE LIGHT SOURCE

BACKGROUND OF THE INVENTION

The present invention relates to an exposure device, and more particularly to an exposure device using a cathode ray tube (hereinafter referred to as "CRT") as an exposure light source to form a CRT image on a photosensitive recording medium.

It has been requested that an image displayed on a CRT be directly recorded on a recording medium. To this end, a photosensitive recording medium is disposed to face the CRT screen through a focusing lens so that the recording medium is exposed to an image bearing light emanated from the CRT screen. With such a positional arrangement, the image recorded on the recording medium is substantially the same size as that displayed on the CRT screen. In order to change recording magnification, the positions of the focusing lens and/or the recording medium need to be moved. Heretofore, a mechanism has been employed for moving the focusing lens and the recording medium.

However, such a mechanism is complicated in structure and thus expensive in cost

SUMMARY OF THE INVENTION

In light of the foregoing, it is an object of this invention to provide an exposure device in which the recording magnification is readily changeable without moving a focusing lens and/or a recording medium.

According to the invention, there is provided an exposure device for exposing a photosensitive recording medium to light to record an image thereon, comprising:

a cathode ray tube for displaying an image on a display screen, the cathode ray tube comprising an electron gun for emitting an electron beam, a horizontal deflection means for horizontally deflecting the electron beam, and a vertical deflection means for vertically deflecting the electron beam;

a horizontal deflection angle changing means for changing the horizontal deflection of the electron beam to change a horizontal length of the image displayed on the display screen;

a vertical deflection angle changing means for changing the vertical deflection of the electron beam to change a vertical length of the image displayed on the display screen; and wherein the photosensitive recording medium is disposed to face the display screen to be exposed to an image bearing light emanated from the display screen, whereby the size of the image recorded on the photosensitive recording medium can be changed by changing the size of the image displayed on the display screen.

According to an embodiment of this invention, the horizonal deflection means is a horizontal coil and the vertical deflection means is a vertical coil. The horizontal deflection angle changing means comprises a first oscillator for producing a first pulsating signal, a first amplifier having an input connected to the first oscillator for amplifying the first pulsating signal and an output connected to the horizontal coil. An amplification factor of the first amplifier is variable as desired. The vertical deflection angle changing means comprises a second oscillator for producing a second pulsating signal, a second amplifier having an input connected to the second oscillator for amplifying the second pulsating signal and an output connected to the vertical coil. An amplification factor of the second amplifier is variable as desired.

In operation, by operating the horizontal and vertical deflection angle changing means, the magnification of the image displayed on the CRT screen can be changed. Accordingly, without changing the positions of the focusing lens and the recording medium, an image recorded on the recording medium can be enlarged or reduced to a desired size. Since the amplification factor of the first amplifier is variable independently of the amplification factor of the second amplifier, at least one of horizontal and vertical sizes of the reproduced image can be changed.

BRIEF DESCRIPTION OF THE DRAWING

In the drawings:

FIG. 2 is a block diagram showing an exposure device according to a modified embodiment of the present invention.

DESCRIPTION OF THE PREFERRED EMBODIMENTS

Figure 1:
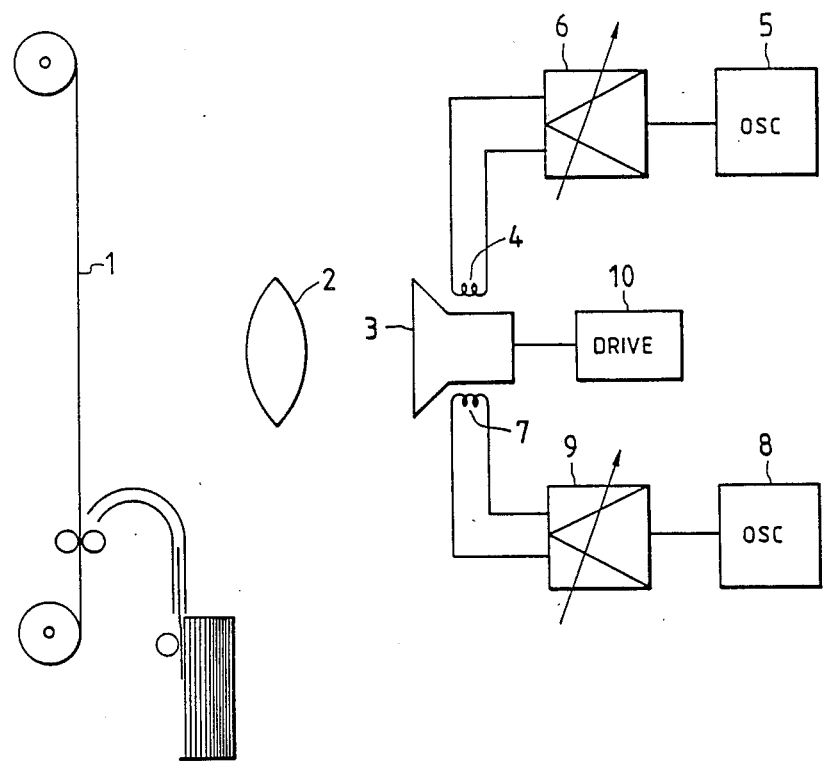
FIG. 1 is a block diagram showing an exposure device according to one embodiment of the present invention.

A preferred embodiment of the present invention will be described with reference to the accompanying drawings.

In the following embodiment of the present invention, used is a photosensitive pressure-sensitive recording medium as disclosed, for example, in U.S. Pat. No. 4,440,846 or 4,399,209. The former U.S. Pat. discloses a self-contained type recording medium and the latter discloses a transfer type recording medium. In the self-contained type, an encapsulated chromogenic material or dye precursour and a developer material are co-deposited on one surface of a single substrate as one layer or as two contiguous layers. In the transfer type, the developer material is coated on a separate substrate as a separate developer sheet. Both the self-contained type and the transfer type are sensitive to light and pressure.

More specifically, such a photosensitive pressure-sensitive recording medium has a substrate on which three kinds of pressure rupturable microcapsules are dispersely deposited. Cyan (C), magenta (M) and yellow (Y) chromogenic materials or dye precursours are separately encapsulated in the microcapsules together with a photo-curing or photo-softening material. The three kinds of the microcapsules are different in photo-sensitivity depending upon the wavelength of light. For example, the microcapsules containing cyan, magenta and yellow chromogenic materials are photo-cured or photo-softened in response to the wavelengths of 650nm, 550nm, 450nm, respectively. By exposing the recording medium to the lights of such wavelengths, a latent image is formed thereon. The recording medium is then subjected to pressure development to rupture the microcapsules which have not photo-cured or remained softened and to react the chromogenic materials released from the ruptured microcapsules with a developer material, whereby a visible image is provided on the same recording medium or a separate developer sheet.

Referring to FIG. 1, a photosensitive pressure-sensitive recording medium 1 is movably disposed in confrontation with the display screen of a color CRT 3 with a predetermined distance therebetween. A focusing lens 2 is interposed between the display screen and the recording medium 1 to focus and project an image displayed on the screen of the CRT 3 onto the recording medium 1. The recording medium 1 thus light exposed is formed with a latent image.

A video signal generator 11 is connected to a CRT drive circuit 10 which in turn is connected to the CRT 3. A video signal generated from the video signal generator 11 is supplied through the CRT drive circuit 10 to the CRT 3. In accordance with the video signal, an image is displayed on the display screen of the CRT 3. As is well known in the art, the CRT 3 is provided with at least one electron gun for emitting an electron beam a horizontal deflection coil 4 for causing to horizontally deflect the electron beam, and a vertical deflection coil 4 for causing to vertically deflect the electron beam. A horizontal deflection angle of the electron beam is changed depending upon the current flowing in the horizontal deflection coil 4. A vertical deflection angle of the electron beam is changed depending upon the current flowing in the vertical deflection coil 7.

A first oscillation circuit 5 is coupled through a first variable amplifier 6 to the horizontal deflection coil 4. The first oscillation&ion circuit 5 outputs a sawtooth waveform signal which is supplied to the first variable amplifier 6 where the supplied signal is amplified. An amplification factor of the amplifier 6 can be varied as desired so that the level of the current flowing through the horizontal deflection coil 4 can be changed as desired and thus the horizontal deflection angle can be changed. In consequence, the horizontal size of the image displayed on the CRT 3 can be changed by changing the amplification factor of the first variable amplifier 6.

A vertical deflection angle of the electron beam is changed depending upon the current flowing in the vertical deflection coil 7. A second oscillation circuit 8 is coupled through a second variable amplifier 9 to the vertical deflection coil 7. The second oscillation circuit 8 outputs a sawtooth wave±form signal which is supplied to the second variable amplifier 9 where the supplied signal is amplified. An amplification factor Of the amplifier 9 can be varied as desired so that the level of the current flowing through the vertical deflection coil 7 can be changed as desired and thus the vertical deflection angle can be changed. In consequence, the vertical size of the image displayed on the CRT 3 can be changed by changing the amplification factor of the second variable amplifier 9.

To summarize, the size of the image displayed on the screen of the CRT 3 is enlarged or reduced depending upon the selection of the amplification factors in the two amplifiers 6 and 9. Therefore, an image can be reproduced on the recording medium I with a desired size if the amplification factors in the amplifiers 6 and 9 are determined to meet the wanted magnification factor of the image to be reproduced on the recording medium 1.

Referring to FIG. 2, there is shown a modified embodiment of the invention. In this embodiment, a CRT 3 is also used as an exposure light source to imagewise expose a photosensitive recording medium 1. A video signal SP representative of an image to be recorded on the recording medium 1 is applied from a video signal generator 11 to the CRT 3. The video signal SP is produced according to signals from a host computer 12.

The video signal SP includes a red signal SR, a green signal SG and a blue signal SB, and a horizontal scan signal SH and a vertical scan signal SV, which are concurrently received from the video signal generator 11. The red, green and blue signals SR, SG and SB correspond to the three primary colors of light, i.e., red, green and blue, of the image to be reproduced. The horizontal and vertical scan signals SH and SV represent positions of a multiplicity of horizontal and vertical scanning lines of the CRT screen. Namely, the signals SH and SV represent the individual picture elements of a picture frame on the screen of the CRT 11.

Source image information to be recorded on the recording medium 1 is sent to &he host computer 12 from a suitable image reader (not shown) connected thereto, or transmitted to the host computer 12 from a remote transmitter (not shown). Alternatively, the source image information is produced by the host computer 12 per se. Usually, the source image information is displayed on a screen provided in the host computer 12.

The video signal generators 11 includes a controller 110 for processing the signals SR, SG, SG, SH and SV and producing the video signal SP. The controller 110 has a central processing unit (CPU), a read-only memory (ROM) and a random access memory (RAM). In accordance with a CRT control program stored in the ROM, the CPU controls a memory controller 111, an exposure-timing control circuit 112, and other components incorporated in the video signal generator 11. More specifically, upon reception of an exposure start signal from a start switch 13, the CPU commands the memory controller 111 to control red, green and blue memories 113, 114, 115 to store tho red, green and blue signals SR, SG, SB for one picture frame, respectively, in response to the horizontal and vertical scan signals SH, SV received from the host computer 12. Upon storage of the signals SR, SG, SB in the respective memories, the picture frame displayed on the screen of the host computer 12 is changed to another picture frame.

The CPU then operates to retrieve the red, green and blue signals SR, SG, SB from the respective red, green and blue memories 113, 114, 115, and send these signals to a red contrast adjusting circuit 116, a green contrast adjusting circuit 117 and a blue contrast adjusting circuit 118, respectively, for adjusting the signals SR, SG, SB to thus regulate the contrasts of the cyan, magenta and yellow picture elements formed on the recording medium 1. The adjustments of the signals SR, SG, SB are performed depending upon the characteristics of the microcapsules C, M and Y coated on the recording medium in terms of the relation between the image density and the amount of light exposure. The adjustments are performed to assure a wide range of gradient of each of the three pigments.

Subsequently, the CPU commands the exposure-timing ciruit 112 to generate a color select signal SL for operating a color selector switch 119 to sequentially apply the red, green and blue signals SR, SG, SB from the adjusting circuits 116, 117, 118 to a drive section 3a of the CRT 3, via a blanking circuit 120, as the video signal SP. Simultaneously, the CPU commands the exposure-timing control circuit 112 to generate a filter select signal SS for commanding a motor driver circuit 14 to drive a motor 15. The motor 15 rotates a rotary filter 17 to an appropriate position. The rotary filter 17 is provided between the CRT 8 and the recording medium 1, which has a blue filter segment 17b, a green filter segment 17g and a red filter segment 17r. These filter segments 17b, 17g, 17r are selectively placed in the operating position aligned with the screen of the CRT 3. The exposure-timing control circuit 112 generates the filter select signal SS to select one of the filter segments, thereby correcting the light emitted from the screen of the CRT 3.

When the rotary color filter 17 is rotated to bring an appropriate filter segment to the operating position, the exposure-timing control circuit 112 applies a blanking signal SA to the blanking circuit 120 to blank the video signal SP, i.e. to cut off the electron beam generated from an electron gun of the CRT 3, until the selected filter segment is set in the operating position. The blanking signal SA also serves to control the blanking time of the CRT 3, which determines the exposure time of the recording medium 1 for each of the microcapsules C, M, Y, i.e., for each of the red, green and blue signals.

The CRT 3 irradiates from its screen a white light beam which corresponds to picture elements designated by the red, green and blue signals SR, SG, SB. The white light beams pass through the selected filter segment and are irradiated onto the surface of the recording medium I, whereby a latent image is formed according to the red, green and blue signals SR, SG, SB. During this irradiation of the image bearing light from the CRT 3, a CRT drive/control circuit 16 applies a high voltage to an anode of the CRT 3 for accelerating the electron beam emitted from the electron gun.

Like the embodiment shown in FIG. 1, a first oscillation circuit 5 is connected to the host computer 12 and generates a sawtooth wave in timed relation to the horizontal scan signal SH fed from the host computer 12. A second oscillation circuit 5 is also connected to the host computer 12 and generates a sawtooth wave in timed relation to the vertical scan signal SV fed therefrom. To the outputs of the first and second oscillator 5, 8, first and second variable amplifiers 6, 9 are connected, respectively. As shown, each variable amplifier comprises a variable resistor having one terminal connected &o the output of the oscillator, and another terminal connected to ground. The output of the first variable amplifier 6 is connected to a horizontal deflection coil driver circuit 4a for driving a horizontal deflection coil 4. The output of the second variable amplifier 9 is connected to a vertical deflection coil driver circuit 7a for driving a vertical deflection coil 7. By varying the amplification factors of the amplifiers 6, 9, i.e. by varying the resistances of the variable resistors, the horizontal and/or vertical size of &he image displayed on the CRT 3 can be changed as desired.

The photosensitive recording medium 1 on which the latent image is formed is moved by the rotation of a take-up roller 23. In timed relation with the movement of the recording medium 1, a developer sheet 22 stacked in a cassette 21 is fed out therefrom. The recording medium 1 and the developer sheet 22 are superposed so that the microcapsule carrying surface of the recording medium 1 and the developer coated surface of the developer sheet 22 are in facial contact with each other and fed into a nip between a pair of rollers 20 for pressure developing the latent image and transferring the developed visible image on the developer sheet 22.

Although description has been made with respect to a specific embodiment, it can be appreciated by a person skilled in the art that a variety of changes and modifications may be made without departing from the scope and spirit of the invention. For example, a monochromatic CRT and a color filter can be employed in lieu of the color CRT. Further, the size of the image to be reproduced can be changed with respect to only one of the horizontal and vertical directions by changing the amplification factor of either one of the amplifiers 6 and 9.

As described, according to the present invention, the change of the magnification of the image to be reproduced can be accomplished by controlling the deflection angle of the electron beam. It is no longer necessary to use a complicated mechanism to change the magnification of the reproducing image. Moreover, since there is no variation in the amount of light caused by the movement of the focusing lens and/or the movement of the exposure position of the recording medium which may otherwise be caused if the magnification changing mechanism is employed, correction of the amount of light applied to the recording medium needs not be performed.

What is claimed is:

1. An exposure device for exposing a photosensitive recording medium to light to record an image thereon, comprising:
   a cathode ray tube for displaying an image on a display screen, said cathode ray tube comprising an electron gun for emitting an electron beam, a horizontal deflection means for horizontally deflecting said electron beam, and a vertical deflection means for vertically deflecting said electron beam;
   a horizontal deflection angle changing means for changing the horizontal deflection of said electron beam to change a horizontal length of said image displayed on said display screen;
   a vertical deflection angle changing means for changing the vertical deflection of said electron beam to change a vertical length of said image displayed o said display screen: and
   wherein said photosensitive recording medium is disposed to face said display screen to be exposed to an image bearing light emanated from said display screen, whereby the size of the image recorded on said photosensitive recording medium can be changed by changing the size of the image displayed on the display screen.

2. An exposure device according to claim 1, wherein said horizonal deflection means comprises a horizontal coil and said vertical deflection means comprises a vertical coil, and wherein said horizontal deflection angle changing means comprises a first oscillator for producing a first pulsating signal, a first amplifier having an input connected to said first oscillator for amplifying said first pulsating signal and an output connected to said horizontal coil, an amplification factor of said first amplifier being variable as desired, and said vertical deflection angle changing means comprises a second oscillator for producing a second pulsating signal, a second amplifier having an input connected to said second oscillator for amplifying said second pulsating signal and an output connected to said vetical coil, an amplification factor of said second amplifier being variable as desired.

3. An exposure device according to claim 1, wherein said amplification factor of said first amplifier is variable independently of said amplification factor of said second amplifier.

4. An exposure device according to claim 3, further comprising a focusing lens disposed between said display screen and said photosensitive recording medium for focusing said image bearing light.

* * * * *